US010618308B2

(12) United States Patent
Matsumoto et al.

(10) Patent No.: US 10,618,308 B2
(45) Date of Patent: Apr. 14, 2020

(54) INK JET RECORDING METHOD (71) Applicants: KAO CORPORATION, Tokyo (JP); THINK LABORATORY CO., LTD., Kashiwa-shi, Chiba (JP)

(72) Inventors: Yuta Matsumoto, Cincinnati, OH (US); Kazuki Watanabe, Sapporo (JP); Yasufumi Ueda, Wakayama (JP); Tatsuo Shigeta, Nagareyama (JP)

(73) Assignees: KAO CORPORATION, Tokyo (JP); THINK LABORATORY CO., LTD., Kashiwa-shi, Chiba (JP)

(*) Notice: Subject to any disclaimer, the term of this patent is extended or adjusted under 35 U.S.C. 154(b) by 0 days.

(21) Appl. No.: 16/076,867

(22) PCT Filed: Feb. 2, 2017

(86) PCT No.: PCT/JP2017/003870
§ 371 (c)(1),
(2) Date: Aug. 9, 2018

(87) PCT Pub. No.: WO2017/138439
PCT Pub. Date: Aug. 17, 2017

(65) Prior Publication Data
US 2019/0039384 A1 Feb. 7, 2019

(30) Foreign Application Priority Data

Feb. 12, 2016 (JP) .................. 2016-025357

(51) Int. Cl.
*B41J 2/21* (2006.01)
*B41M 5/00* (2006.01)
(Continued)

(52) U.S. Cl.
CPC .............. *B41J 2/21* (2013.01); *B41J 11/002* (2013.01); *B41M 5/0023* (2013.01);
(Continued)

(58) Field of Classification Search
CPC ... B41J 2/21; B41J 2/211; B41J 2/2114; B41J 2/2117; B41J 11/002; B41M 5/0023;
(Continued)

(56) References Cited

U.S. PATENT DOCUMENTS

2003/0149130 A1  8/2003  Kondo
2003/0169322 A1  9/2003  Shima et al.
(Continued)

FOREIGN PATENT DOCUMENTS

CN   101701115 A   5/2010
CN   101835618 A   9/2010
(Continued)

OTHER PUBLICATIONS

Chinese Office Action and Search Report, dated Jul. 1, 2019, for Chinese Application No. 201780010856.9, with English translation of the Chinese Office Action.
(Continued)

*Primary Examiner* — Juanita D Jackson
(74) *Attorney, Agent, or Firm* — Birch, Stewart, Kolasch & Birch, LLP (57) ABSTRACT The present invention relates to an ink-jet printing method that is capable of obtaining good printed materials that are free of occurrence of color migration and deformation of a printing medium even when printed on a transparent resin printing medium using a water-based ink containing a white ink, and a black or chromatic ink. The present invention provides an ink-jet printing method including the step of ejecting a water-based ink onto a printing medium using a printing apparatus to print characters or images on the printing medium, said printing apparatus including an ink-jet printing head that ejects the water-based ink onto the printing medium that is transported in a feeding direction thereof; and an drying mechanism that is disposed on a
(Continued)

downstream side in a feeding direction of the printing medium, in which the printing medium is in the form of a transparent resin printing medium, and the water-based ink includes a white ink, and a black or chromatic ink, and in which the drying mechanism blows a superheated steam that is heated to a temperature of 100 to 180° C. onto at least one of a printing surface and an opposite surface of the printing medium.

7 Claims, 1 Drawing Sheet

(51) Int. Cl.
| | |
|---|---|
| C09D 11/40 | (2014.01) |
| B41J 11/00 | (2006.01) |
| B41M 5/50 | (2006.01) |
| B41M 7/00 | (2006.01) |

(52) U.S. Cl.
CPC ........ *B41M 5/0047* (2013.01); *B41M 5/0064* (2013.01); *B41M 5/50* (2013.01); *B41M 7/009* (2013.01); *C09D 11/40* (2013.01)

(58) Field of Classification Search
CPC .... B41M 5/0047; B41M 5/0064; B41M 5/50; B41M 7/009; C09D 11/40
See application file for complete search history.

(56) References Cited

U.S. PATENT DOCUMENTS

| | | | |
|---|---|---|---|
| 2009/0081423 | A1 | 3/2009 | Sano |
| 2010/0009136 | A1 | 1/2010 | Oyanagi et al. |
| 2010/0302300 | A1* | 10/2010 | Verdonck .................. 347/17 |
| 2011/0037804 | A1 | 2/2011 | Oyanagi et al. |
| 2012/0062640 | A1 | 3/2012 | Uraki et al. |
| 2013/0096225 | A1 | 4/2013 | Verdonck |
| 2013/0182057 | A1 | 7/2013 | Koase |
| 2014/0132684 | A1 | 5/2014 | Ohta |
| 2014/0375734 | A1 | 12/2014 | Takeuchi et al. |
| 2015/0054883 | A1 | 2/2015 | Okuda et al. |
| 2015/0097906 | A1 | 4/2015 | Beier et al. |
| 2015/0191031 | A1 | 7/2015 | Ohta et al. |
| 2015/0197654 | A1 | 7/2015 | Okuda et al. |
| 2016/0090483 | A1 | 3/2016 | Fukuroi et al. |
| 2016/0130453 | A1 | 5/2016 | Eguchi et al. |
| 2016/0159110 | A1 | 6/2016 | Beier et al. |

FOREIGN PATENT DOCUMENTS

| | | | |
|---|---|---|---|
| CN | 104661825 A | 5/2015 | |
| CN | 104774504 A | 7/2015 | |
| CN | 104816545 A | 8/2015 | |
| CN | 204526443 U | 8/2015 | |
| CN | 105229085 A | 1/2016 | |
| JP | 58-188685 A | 11/1983 | |
| JP | 64-11841 A | 1/1989 | |
| JP | 2-162045 A | 6/1990 | |
| JP | 2003-182061 A | 7/2003 | |
| JP | 2003-260866 A | 9/2003 | |
| JP | 2004-18546 A | 1/2004 | |
| JP | 2004-181816 A | 7/2004 | |
| JP | 2008-44367 A | 2/2008 | |
| JP | 2008-200850 A | 9/2008 | |
| JP | 2008-200856 A | 9/2008 | |
| JP | 2009-56613 A | 3/2009 | |
| JP | 2009-221283 A | 10/2009 | |
| JP | 2010-106374 A | 5/2010 | |
| JP | 2010-137519 A | 6/2010 | |
| JP | 2010137519 * | 6/2010 | ................ B41J 2/01 |
| JP | 2010-158861 A | 7/2010 | |
| JP | 2010-201714 A | 9/2010 | |
| JP | 2013-10364 A | 1/2013 | |
| JP | 2013-52577 A | 3/2013 | |
| JP | 2013-154612 A | 8/2013 | |
| JP | 2013-166271 A | 8/2013 | |
| JP | 2014-47302 A | 3/2014 | |
| JP | 2014-94495 A | 5/2014 | |
| JP | 2015-128826 A | 7/2015 | |
| JP | 2015-182348 A | 10/2015 | |
| JP | 2015-183112 A | 10/2015 | |
| JP | 2016-221781 A | 12/2016 | |
| WO | WO 2014/196578 A1 | 12/2014 | |

OTHER PUBLICATIONS

English translation of International Search Report (PCT/ISA/210) for International Application No. PCT/JP2017/003866, dated Apr. 11, 2017.
International Search Report (PCT/ISA/210) for International Application No. PCT/JP2017/003867, dated Mar. 28, 2017, with an English translation.
International Search Report (PCT/ISA/210) for International Application No. PCT/JP2017/003869, dated Feb. 28, 2017, with an English translation.
International Search Report (PCT/ISA/210) issued in PCT/JP2017/003870, dated Feb. 28, 2017.
Extended European Search Report dated Sep. 11, 2019, for European Patent Application No. 17750162.4.
Extended European Search Report dated Sep. 10, 2019 for Application No. 17750163.2.
Extended European Search Report dated Aug. 16, 2019 for Application No. 17750160.8.
Extended European Search Report dated Aug. 16, 2019 for Application No. 17750161.6.
U.S. Appl. No. 16/077,131, filed Aug. 10, 2018.
U.S. Appl. No. 16/077,159, filed Aug. 10, 2018.
U.S. Appl. No. 16/077,298, filed Aug. 17, 2018.

* cited by examiner

Fig. 1

Fig. 2

INK JET RECORDING METHOD

FIELD OF THE INVENTION

The present invention relates to an ink-jet printing method.

BACKGROUND OF THE INVENTION

In ink-jet printing methods, droplets of ink are directly projected onto a printing medium from very fine nozzles and allowed to adhere to the printing medium to form characters or images thereon. The ink-jet printing methods have now been extensively employed not only in printing applications for ordinary consumers but also recently in commercial and industrial printing applications because of various advantages such as easiness of full coloration, low cost, capability of using a plain paper as the printing medium, non-contact with printed characters or images, etc.

In the commercial and industrial printing applications, for example, there has been proposed a high-speed printing method in which a rolled synthetic resin film is scanned using a stationary printing head of a line printing type.

In the high-speed printing using a resin printing medium, since it is needed to conduct the work for taking up the printing medium, there is an increasing demand for quick-drying technologies for drying an ink used therein. As the quick-drying technologies for printed materials, an infrared drying system capable of drying the printed materials with a high energy immediately after being printed is considered to be effective. However, when irradiating portions of characters or images formed by color inks with infrared rays, owing to the difference between infrared absorption amounts of a yellow ink, a magenta ink, a cyan ink and a black ink among the color inks, a temperature difference tends to be caused on a surface of the printing medium, in particular, the portion of the printing medium which is printed by the black ink tends to be heated to an elevated temperature, so that there tends to occur such a problem that the printing medium suffers from thermal deformation.

Under these circumstances, there have been proposed printing apparatuses that are equipped with a means for accelerating drying of a printing medium.

JP 2010-137519A (Patent Literature 1) discloses an image-forming apparatus that includes a printing head for ejecting droplets of a liquid, a transportation means for transporting a printing medium in an opposed relation to the printing head, and a means for bringing a superheated steam into contact with the printing medium on at least one of an upstream side and a downstream side of the printing head in a transporting direction of the printing medium.

JP 2010-158861A (Patent Literature 2) discloses a printing apparatus such as an ink-jet printer which includes a printing means for performing printing onto a printing medium, a transportation means for transporting the printing medium, and a drying means for emitting a superheated steam to the printing medium to accelerate drying of the printing medium.

SUMMARY OF THE INVENTION

The present invention relates to an ink-jet printing method including the step of ejecting a water-based ink onto a printing medium using a printing apparatus to print characters or images on the printing medium, said printing apparatus including an ink-jet printing head that ejects the water-based ink onto the printing medium that is transported in a feeding direction thereof; and an drying mechanism that is disposed on a downstream side in a feeding direction of the printing medium, in which the printing medium is in the form of a transparent resin printing medium, and the water-based ink includes a white ink, and a black or chromatic ink, and in which the drying mechanism blows a superheated steam that is heated to a temperature of not lower than 100° C. and not higher than 180° C. against at least one of a printing surface and an opposite surface of the printing medium.

DETAILED DESCRIPTION OF THE INVENTION

The printing methods using the ink-jet printing apparatuses as described in Patent Literatures 1 and 2 have failed to fully suppress occurrence of color migration to a resin printing medium and deformation of the resin printing medium, and therefore failed to obtain printed materials that are fully satisfactorily usable in the practical applications.

Also, since no white ink is used in Patent Literatures 1 and 2, the technologies described in Patent Literatures 1 and 2 have failed to make any study on problems concerning the difference in temperature between the white ink and the other color ink when heated.

In the ink-jet printing methods using a transparent resin printing medium, it is highly demanded to use a white ink therein. Therefore, it has been required to provide ink-jet printing methods capable of simultaneously drying the white ink and the other ink (black or chromatic ink).

The present invention relates to an ink-jet printing method that is capable of obtaining good printed materials that are free of occurrence of color migration and deformation of a printing medium even when printed on a transparent resin printing medium using a water-based ink including a white ink and a black or chromatic ink.

Meanwhile, the term "printing" as used herein is a concept that includes printing or typing for printing characters or images, and the term "printed material" as used herein is a concept that includes printed matters or typed materials on which characters or images are printed.

The present inventors have found that in ink-jet printing methods using a transparent resin printing medium, by simultaneously drying a white ink and a black or chromatic ink using a superheated steam heated to a specific temperature, it is possible to obtain good printed materials that are free of occurrence of color migration and deformation of the printing medium.

That is, the present invention relates to an ink-jet printing method including the step of ejecting a water-based ink onto a printing medium using a printing apparatus to print characters or images on the printing medium, said printing apparatus including an ink-jet printing head that ejects the water-based ink onto the printing medium that is transported in a feeding direction thereof and an drying mechanism that is disposed on a downstream side in a feeding direction of the printing medium, in which the printing medium is in the form of a transparent resin printing medium, and the water-based ink includes a white ink, and a black or chromatic ink, and in which the drying mechanism blows a superheated steam that is heated to a temperature of not lower than 100° C. and not higher than 180° C. against at least one of a printing surface and an opposite surface of the printing medium.

According to the present invention, there is provided an ink-jet printing method that is capable of obtaining good printed materials that are free of occurrence of color migration and deformation of a printing medium even when printed on a transparent resin printing medium using a water-based ink including a white ink and a black or chromatic ink.

[Ink-Jet Printing Method]

The ink-jet printing method of the present invention is a printing method including the step of ejecting a water-based ink onto a printing medium using a printing apparatus to print characters or images on the printing medium, said printing apparatus including an ink-jet printing head that ejects the water-based ink onto the printing medium that is transported in a feeding direction thereof; and an drying mechanism that is disposed on a downstream side in a feeding direction of the printing medium, in which the printing medium is in the form of a transparent resin printing medium, and the water-based ink includes a white ink, and a black or chromatic ink, and in which the drying mechanism blows a superheated steam that is heated to a temperature of not lower than 100° C. and not higher than 180° C. against at least one of a printing surface and an opposite surface of the printing medium.

Conventionally, it is known that infrared irradiation is used as a drying means in ink-jet printing methods. However, upon drying by the infrared irradiation, the difference between temperatures of respective colors of inks printed on the printing medium is increased owing to the difference between infrared absorption amounts thereof, so that it tends to be difficult to obtain good printed materials that are free of occurrence of color migration and deformation of the printing medium.

According to the ink-jet printing method of the present invention, a superheated steam heated to a temperature of not lower than 100° C. and not higher than 180° C. is simultaneously blown against the characters or images formed by using the white ink and the other ink (black or chromatic ink) which are present in a mixed state therein. For this reason, it is considered that the resin printing medium is free of drying unevenness on its printed surface and therefore can be quickly dried without thermal deformation of the resin printing medium.

<Water-Based Ink>

The water-based ink used in the present invention (hereinafter also referred to merely as an "ink") contains at least a pigment (A) and water. Also, the water-based ink may further contain a polymer (B), an organic solvent (C), a surfactant (D) and other components, if required. Meanwhile, the term "water-based" as used in the present specification means that water has a largest content among components of a medium contained in the ink.

<Pigment (A)>

The pigment used in the present invention may be any kind of pigment, i.e., may be either an inorganic pigment or an organic pigment.

Specific examples of the inorganic pigment include carbon blacks, metal oxides and the like. The carbon blacks are preferably used as a pigment for black inks. The carbon blacks may include furnace blacks, thermal lamp blacks, acetylene blacks and channel blacks. As a pigment for white inks, there may be used metal oxides such as titanium oxide, zinc oxide, silica, alumina and magnesium oxide, etc. Among these pigments for white inks, preferred is titanium oxide.

Specific examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments. The organic pigments are preferably used for chromatic inks. The hue of the organic pigment used in the present invention is not particularly limited, and there may be used any chromatic pigment having a yellow color, a magenta color, a cyan color, a red color, a blue color, an orange color, a green color, etc.

The average particle size of the pigment particles in the black ink and chromatic ink is preferably not less than 60 nm and not more than 180 nm from the viewpoint of improving a tinting power and dispersion stability of the resulting ink. The average particle size of the pigment particles in the white ink is preferably not less than 150 nm and not more than 400 nm from the viewpoint of improving hiding power (whiteness) of the resulting white ink.

The pigment used in the present invention may be in the form of at least one pigment selected from the group consisting of a self-dispersible pigment, and particles formed by dispersing a pigment with the polymer (B).

[Self-Dispersible Pigment]

The self-dispersible pigment that may be used in the present invention means a pigment onto a surface of which at least one hydrophilic functional group (including an anionic hydrophilic group such as a carboxy group and a sulfonic group or a cationic hydrophilic group such as a quaternary ammonium group) is bonded either directly or through the other atom group such as an alkanediyl group having 1 to 12 carbon atoms to thereby render the pigment dispersible in an aqueous medium without using a surfactant or a resin. In order to form a pigment into a self-dispersible pigment, for example, a necessary amount of the hydrophilic functional group may be chemically bonded to the surface of the pigment by an ordinary method. Specific examples of commercially available products of the self-dispersible pigment include "CAB-O-JET 200", "CAB-O-JET 300", "CAB-O-JET 352K", "CAB-O-JET 250A", "CAB-O-JET 260M", "CAB-O-JET 270Y", "CAB-O-JET 450A", "CAB-O-JET 465M", "CAB-O-JET 470Y" and "CAB-O-JET 480V" available from Cabot Japan K.K.; "BONJET CW-1", "BONJET CW-2", etc., available from Orient Chemical Industries Co., Ltd.; "Aqua-Black 162", etc., available from Tokai Carbon Co., Ltd.; and "SENSIJET BLACK SDP-100", "SENSIJET BLACK SDP-1000", "SENSIJET BLACK SDP-2000", etc., available from SENSIENT INDUSTRIAL COLORS. The self-dispersible pigment is preferably used in the form of a pigment water dispersion prepared by dispersing the pigment in water.

[Particles Formed by Dispersing Pigment with Polymer (B)]

In the present invention, the pigment may be used in the form of particles formed by dispersing the pigment with the polymer (B). Examples of the configuration of the particles formed by dispersing the pigment with the polymer include 1) particles formed by kneading the pigment and the polymer and then dispersing the resulting kneaded material in a medium such as water; 2) particles formed by stirring the pigment and the polymer in a medium such as water to disperse the pigment in the medium such as water; 3) particles formed by mechanically dispersing the polymer raw material and the pigment to polymerize the polymer raw material and then dispersing the pigment in a medium such as water with the resulting polymer; and the like.

Furthermore, from the viewpoint of improving storage stability of the resulting ink, the polymer that is present in the particles formed by dispersing the pigment with the polymer may be crosslinked with a crosslinking agent. Examples of the crosslinking agent include compounds containing two or more functional groups that are capable of reacting with a functional group contained in the polymer. For example, in the case where the polymer contains a carboxy group, as the preferred crosslinking agent, there may be mentioned a polyglycidyl ether compound of a polyhydric alcohol.

[Polymer (B)]

In the present invention, from the viewpoint of improving dispersibility of the pigment as well as from the viewpoint of improving fusing properties of printed characters or images, the water-based ink preferably further contains the polymer (B). Examples of the polymer (B) used in the present invention include condensation-based resins such as polyurethanes and polyesters, and vinyl-based polymers such as acrylic resins, styrene-based resins, styrene-acrylic resins, butadiene-based resins, styrene-butadiene-based resins, vinyl chloride-based resins, vinyl acetate-based resins and acrylic-silicone-based resins. Among these polymers, preferred are vinyl-based polymers.

The weight average molecular weight of the polymer (B) is preferably not less than 10,000, more preferably not less than 20,000, even more preferably not less than 30,000 and further even more preferably not less than 40,000, and is also preferably not more than 2,500,000 and more preferably not more than 1,000,000, from the viewpoint of improving dispersibility of the pigment as well as from the viewpoint of improving fusing properties of printed characters or images.

The polymer (B) used in the present invention may be used as a pigment dispersing polymer (B-1) for dispersing the pigment and a fusing aid polymer (B-2) for improving rub fastness of the resulting printed materials. These polymers (B-1) and (B-2) may be used in combination with each other.

[Pigment Dispersing Polymer (B-1)]

Examples of the pigment dispersing polymer (B-1) for dispersing the pigment used include condensation-based resins such as polyesters and polyurethanes, and vinyl-based polymers, etc. Among these polymers, from the viewpoint of improving dispersion stability of the pigment, preferred are vinyl-based polymers obtained by addition-polymerizing a vinyl monomer (such as vinyl compounds, vinylidene compounds and vinylene compounds). As the pigment dispersing polymer (B-1), there may be used either appropriately synthesized products or commercially available products.

The weight average molecular weight of the pigment dispersing polymer (B-1) is preferably not less than 20,000, more preferably not less than 30,000 and even more preferably not less than 40,000, and is also preferably not more than 500,000, more preferably not more than 300,000 and even more preferably not more than 200,000, from the viewpoint of improving dispersibility of the pigment.

Examples of the vinyl-based polymers include polyacrylic acids such as "ARON AC-10SL" available from Toagosei Co., Ltd., and styrene-acrylic resins such as "JONCRYL 67", "JONCRYL 611", "JONCRYL 678", "JONCRYL 680", "JONCRYL 690" and "JONCRYL 819" all available from BASF Japan, Ltd., etc.

[Fusing Aid Polymer (B-2)]

The fusing aid polymer (B-2) is preferably used in the form of pigment-free polymer particles. Examples of components of the fusing aid polymer (B-2) include condensation-based resins such as polyurethanes and polyesters, and vinyl-based polymers such as acrylic resins, styrene-based resins, styrene-acrylic resins, butadiene-based resins, styrene-butadiene-based resins, vinyl chloride-based resins, vinyl acetate-based resins and acrylic-silicone-based resins. Among these polymers, from the viewpoint of promoting drying of the resulting ink on a printing substrate and improving rub fastness of the resulting printed materials, preferred are acrylic resins.

In addition, from the viewpoint of enhancing productivity of the water-based ink, the fusing aid polymer (B-2) is preferably used in the form of a dispersion containing polymer particles. As the fusing aid polymer (B-2), there may be used either appropriately synthesized products or commercially available products.

The fusing aid polymer (B-2) may be produced by copolymerizing a mixture of monomers by known polymerization methods. Examples of the preferred polymerization methods include an emulsion polymerization method and a suspension polymerization method. Among these polymerization methods, more preferred is the emulsion polymerization method.

Examples of commercially available products of the fusing aid polymer (B-2) include acrylic resins such as "Neocryl A1127" (anionic self-crosslinkable aqueous acrylic resin) available from DSM NeoResins, Inc., and "JONCRYL 390" available from BASF Japan, Ltd.; urethane resins such as "WBR-2018" and "WBR-2000U" both available from Taisei Fine Chemical Co., Ltd.; styrene-butadiene resins such as "SR-100" and "SR102" both available from Nippon A & L Inc.; styrene-acrylic resins such as "JONCRYL 7100", "JONCRYL 7600", "JONCRYL 537J", "JONCRYL PDX-7164", "JONCRYL 538J" and "JONCRYL 780" all available from BASF Japan, Ltd.; and vinyl chloride-based resins such as "VINYBLAN 700" and "VINYBLAN 701" both available from Nissin Chemical Industry Co., Ltd., etc.

The fusing aid polymer (B-2) may be used in the form of particles dispersed in water. The dispersion of the particles of the fusing aid polymer (B-2) serves for forming a film of the resulting ink on a printing substrate and improving fusing properties of the ink.

The weight average molecular weight of the fusing aid polymer (B-2) used in the present invention is preferably not less than 10,000, more preferably not less than 20,000 and even more preferably not less than 50,000, and is also preferably not more than 2,500,000 and more preferably not more than 1,000,000, from the viewpoint of improving fusing properties of the resulting ink.

In addition, the average particle size of particles of the fusing aid polymer (B-2) in the dispersion containing the particles of the fusing aid polymer (B-2) or in the resulting ink is preferably not less than 10 nm, more preferably not less than 30 nm and even more preferably not less than 50 nm, and is also preferably not more than 300 nm, more preferably not more than 200 nm, even more preferably not more than 150 nm and further even more preferably not more than 130 nm, from the viewpoint of improving storage stability of the resulting ink.

<Organic Solvent (C)>

As the organic solvent (C), there may be used those organic solvents having a boiling point of not lower than 90°

C. and lower than 250° C. from the viewpoint of suppressing occurrence of color migration of the black or chromatic water-based ink and deformation of the printing medium as well as from the viewpoint of improving continuous ejection properties of the resulting ink upon high-speed printing. The boiling point of the organic solvent (C) is preferably not lower than 130° C., more preferably not lower than 140° C. and even more preferably not lower than 150° C., and is also preferably not higher than 245° C., more preferably not higher than 240° C. and even more preferably not higher than 235° C., from the same viewpoints as described above.

Examples of the organic solvent (C) include a polyhydric alcohol (c-1) and a glycol ether (c-2), etc.

Examples of the aforementioned polyhydric alcohol (c-1) include 1,2-alkanediols such as ethylene glycol (boiling point (b.p.) 197° C.), propylene glycol (b.p. 188° C.), 1,2-butanediol (b.p. 193° C.), 1,2-pentanediol (b.p. 206° C.) and 1,2-hexanediol (b.p. 223° C.), diethylene glycol (b.p. 245° C.), polyethylene glycol, dipropylene glycol (b.p. 232° C.), 1,3-propanediol (b.p. 210° C.), 1,3-butanediol (b.p. 208° C.), 1,4-butanediol (b.p. 230° C.), 3-methyl-1,3-butanediol (b.p. 203° C.), 1,5-pentanediol (b.p. 242° C.), 2-methyl-2,4-pentanediol (b.p. 196° C.), 1,2,6-hexanetriol (b.p. 178° C.), 1,2,4-butanetriol (b.p. 190° C.), 1,2,3-butanetriol (b.p. 175° C.) and petriol (b.p. 216° C.).

Among these polyhydric alcohols, from the viewpoint of improving storage stability and continuous ejection properties of the resulting ink, preferred is at least one polyhydric alcohol selected from the group consisting of alkanediols having not less than 2 and not more than 6 carbon atoms, such as propylene glycol, diethylene glycol and 1,2-hexanediol, and polypropylene glycols having a molecular weight of 500 to 1000, and more preferred is at least one polyhydric alcohol selected from the group consisting of 1,2-alkanediols having not less than 3 and not more than 4 carbon atoms, such as propylene glycol and diethylene glycol, and the aforementioned polypropylene glycols.

(Glycol Ether (c-2))

Specific examples of the glycol ether (c-2) include alkylene glycol monoalkyl ethers and alkylene glycol dialkyl ethers. Among these compounds, from the viewpoint of improving continuous ejection properties of the resulting ink as well as from the viewpoint of obtaining good printed materials that are free of occurrence of color migration or deformation of the printing medium, preferred are alkylene glycol monoalkyl ethers. The number of carbon atoms in an alkyl group of the alkylene glycol monoalkyl ethers is preferably not less than 1, more preferably not less than 2 and even more preferably not less than 3, and is also preferably not more than 6 and more preferably not more than 4. The alkyl group of the alkylene glycol monoalkyl ethers may be in the form of either a straight chain or a branched chain.

Specific examples of the alkylene glycol monoalkyl ethers include ethylene glycol ethyl ether (b.p. 136° C.), ethylene glycol isopropyl ether (b.p. 144° C.), ethylene glycol propyl ether (b.p. 151° C.), ethylene glycol butyl ether (b.p. 171° C.), diethylene glycol methyl ether (b.p. 194° C.), diethylene glycol ethyl ether (b.p. 202° C.), diethylene glycol isopropyl ether (b.p. 207° C.), diethylene glycol isobutyl ether (b.p. 230° C.), diethylene glycol butyl ether (b.p. 230° C.), triethylene glycol methyl ether (b.p. 248° C.), dipropylene glycol butyl ether (b.p. 231° C.), dipropylene glycol methyl ether (b.p. 189° C.) and tripropylene glycol methyl ether (b.p. 243° C.).

Of these alkylene glycol monoalkyl ethers, preferred is at least one compound selected from the group consisting of ethylene glycol isopropyl ether, ethylene glycol propyl ether, diethylene glycol methyl ether, diethylene glycol isopropyl ether, diethylene glycol isobutyl ether and diethylene glycol butyl ether, and more preferred is at least one compound selected from the group consisting of ethylene glycol isopropyl ether, diethylene glycol isopropyl ether and diethylene glycol isobutyl ether.

(Other Organic Solvents)

In the present invention, the water-based ink may also contains, in addition to the aforementioned organic solvent (C), those organic solvents that may be usually compounded in the water-based ink, such as the other alcohols, alkyl ethers of the alcohols, glycol ethers, nitrogen-containing heterocyclic compounds such as N-methyl-2-pyrrolidone, amides, amines and sulfur-containing compounds.

For example, 1,6-hexanediol (b.p. 250° C.), triethylene glycol (b.p. 285° C.), tripropylene glycol (b.p. 273° C.), polypropylene glycol (b.p. not lower than 250° C.) and glycerin (b.p. 290° C.), etc., may be used in combination with the aforementioned compound having a boiling point of lower than 250° C.

<Surfactant (D)>

The water-based ink used in the present invention preferably also contains a surfactant (D) from the viewpoint of suppressing increase in viscosity of the resulting ink, improving continuous ejection properties of the ink and obtaining good printed materials that are free of occurrence of color migration or deformation of the printing medium. As the surfactant (D), there are preferably used those surfactants containing a silicone-based surfactant (d-1).

The silicone-based surfactant (d-1) is not particularly limited, and any suitable silicone-based surfactant may be appropriately selected and used as the silicone-based surfactant (d-1) according to the objects and applications of the water-based ink. Among these silicone-based surfactants, from the viewpoint of suppressing increase in viscosity of the resulting ink, improving continuous ejection properties of the ink and obtaining good printed materials that are free of occurrence of color migration or deformation of the printing medium, a polyether-modified silicone-based surfactant is preferably used.

(Polyether-Modified Silicone-Based Surfactant)

The polyether-modified silicone-based surfactant is capable of suppressing increase in viscosity of the resulting ink and occurrence of intercolor bleeding between the inks. Therefore, it is considered that the polyether-modified silicone-based surfactant contributes to production of good printed materials that are free of occurrence of color migration upon high-speed printing.

The polyether-modified silicone-based surfactant has such a structure that a hydrocarbon group bonded to a side chain and/or a terminal end of a silicone oil is substituted with a polyether group. Examples of the suitable polyether group of the polyether-modified silicone-based surfactant include a polyethyleneoxy group, a polypropyleneoxy group and a polyalkyleneoxy group formed by addition-bonding an ethyleneoxy group (EO) and a propyleneoxy group (a trimethyleneoxy group or a propane-1,2-diyloxy group; PO) to each other in a block form or a random form. More specifically, as the polyether-modified silicone-based surfactant, there may be used a compound formed by grafting a polyether group to a main chain of a silicone, a compound formed by bonding a silicone and a polyether group to each other in a block form, etc.

The HLB value of the polyether-modified silicone-based surfactant is preferably not less than 3.0, more preferably not less than 4.0 and even more preferably not less than 4.5 from the viewpoint of improving solubility of the polyether-modified silicone-based surfactant in the water-based ink. The term "HLB" as used herein means the value indicating an affinity of the surfactant to water and an oil, and can be calculated according to the following formula by Griffin method. Meanwhile, as the "hydrophilic group contained in surfactant" shown in the following formula, there may be mentioned, for example, a hydroxy group and an ethyleneoxy group.

$$HLB=20\times[(\text{molecular weight of hydrophilic group contained in surfactant})/(\text{molecular weight of surfactant})]$$

Specific examples of the polyether-modified silicone-based surfactant include "KF" series products available from Shin-Etsu Chemical Industry Co., Ltd., "SILFACE SAG" available from Nissin Chemical Industry Co., Ltd., and "BYK" series products available from BYK Chemie Japan K.K.

(Other Surfactants)

In the present invention, as the surfactant (D), the surfactants other than the polyether-modified silicone-based surfactant may be used in combination therewith. Among the surfactants other than the polyether-modified silicone-based surfactant, from the viewpoint of attaining good applicability to the ink, preferred is a nonionic surfactant.

Examples of the nonionic surfactant include (1) alkyl ethers, alkenyl ethers, alkynyl ethers or aryl ethers of polyoxyalkylenes which are produced by adding ethyleneoxide, propyleneoxide or butyleneoxide (hereinafter collectively referred to as an "alkyleneoxide") to a saturated or unsaturated, linear or branched higher alcohol having 8 to 22 carbon atoms, a polyhydric alcohol or an aromatic alcohol, (2) esters of a higher alcohol containing a saturated or unsaturated, linear or branched hydrocarbon group having 8 to 22 carbon atoms, and a polyvalent fatty acid, (3) polyoxyalkylene aliphatic amines containing a linear or branched alkyl group or alkenyl group having 8 to 20 carbon atoms, and (4) ester compounds of a higher fatty acid having 8 to 22 carbon atoms and a polyhydric alcohol, or compounds produced by adding an alkyleneoxide to the ester compounds.

Examples of commercially available products of the nonionic surfactant include "SURFYNOL" series products available from Nissin Chemical Industry Co., Ltd., and Air Products & Chemicals, Inc., "ACETYLENOL" series products available from Kawaken Fine Chemicals Co., Ltd., and "EMULGEN 120" (polyoxyethylene lauryl ether) available from Kao Corporation.

[Contents of Respective Components in Water-Based Ink and Properties of Water-Based Ink]

The contents of the respective components in the water-based ink used in the present invention as well as various properties of the water-based ink are as follows.

(Content of Pigment (A))

The content of the pigment (A) in the black or chromatic water-based ink is preferably not less than 2.0% by mass, more preferably not less than 4.0% by mass and even more preferably not less than 6.0% by mass from the viewpoint of enhancing optical density of the water-based ink printed. Also, the content of the pigment (A) in the black or chromatic water-based ink is preferably not more than 30.0% by mass, more preferably not more than 20% by mass, even more preferably not more than 15% by mass and further even more preferably not more than 10.0% by mass from the viewpoint of reducing viscosity of the water-based ink upon volatilization of the solvent therefrom as well as from the viewpoint of improving continuous ejection properties of the water-based ink and obtaining good printed materials that are free of occurrence of color migration or deformation of the printing medium.

The content of the pigment (A) in the white water-based ink is preferably not less than 4.0% by mass, more preferably not less than 6.0% by mass and even more preferably not less than 8.0% by mass, and is also preferably not more than 40% by mass, more preferably not more than 30% by mass, even more preferably not more than 20% by mass and further even more preferably not more than 15% by mass, from the viewpoint of completely covering the image 1 printed by the black and chromatic inks with the white ink to thereby eliminate color unevenness or mottling of the printed surface and prevent occurrence of thermal deformation of the resin printing medium.

(Content of Polymer (B))

The content of the polymer (B) in the water-based ink is preferably not less than 1.0% by mass, more preferably not less than 2.0% by mass and even more preferably not less than 3.0% by mass, and is also preferably not more than 20% by mass, more preferably not more than 13% by mass and even more preferably not more than 8.0% by mass, from the viewpoint of improving fusing properties of the water-based ink. The content of the polymer (B) as used herein means a total content of the pigment dispersing polymer (B-1) of the pigment-containing polymer particles and the fusing aid polymer (B-2).

In addition, in the case where the polymer (B) is used as the pigment dispersing polymer (B-1), the content of the pigment dispersing polymer (B-1) in the water-based ink is preferably not less than 0.01% by mass, more preferably not less than 0.05% by mass and even more preferably not less than 0.1% by mass, and is also preferably not more than 10% by mass, more preferably not more than 7.0% by mass and even more preferably not more than 5.0% by mass, from the viewpoint of improving fusing properties of the water-based ink.

Furthermore, in the case where the polymer (B) is used as the fusing aid polymer (B-2) in the ink, the content of the fusing aid polymer (B-2) in the water-based ink is preferably not less than 0.9% by mass, more preferably not less than 1.0% by mass and even more preferably not less than 1.2% by mass, and is also preferably not more than 10% by mass, more preferably not more than 6.0% by mass and even more preferably not more than 3.0% by mass, from the viewpoint of improving fusing properties of the water-based ink.

(Content of Organic Solvent (C))

The content of the organic solvent (C) in the water-based ink is preferably not less than 15% by mass, more preferably not less than 20% by mass and even more preferably not less than 25% by mass, and is also preferably not more than 45% by mass, more preferably not more than 40% by mass and even more preferably not more than 35% by mass, from the viewpoint of improving continuous ejection properties of the water-based ink.

The content of the polyhydric alcohol (c-1) in the water-based ink is preferably not less than 10% by mass, more preferably not less than 15% by mass and even more preferably not less than 20% by mass, and is also preferably not more than 45% by mass, more preferably not more than 40% by mass and even more preferably not more than 35% by mass, from the viewpoint of improving storage stability and continuous ejection properties of the water-based ink.

The content of the glycol ether (c-2) in the water-based ink is preferably not less than 1% by mass, more preferably not less than 2% by mass and even more preferably not less than 3% by mass, and is also preferably not more than 15% by mass, more preferably not more than 12% by mass and even more preferably not more than 8% by mass, from the viewpoint of improving storage stability and continuous ejection properties of the water-based ink.

The content of a high-boiling organic solvent having a boiling point of not lower than 250° C. in the water-based ink used in the present invention is preferably not more than 5% by mass, more preferably not more than 4% by mass and even more preferably not more than 3% by mass from the viewpoint of imparting adequate drying properties to the water-based ink and inhibiting occurrence of color migration, upon high-speed printing.

(Content of Surfactant (D))

The total content of the surfactant (D) in the water-based ink is preferably not less than 0.05% by mass, more preferably not less than 0.1% by mass and even more preferably not less than 0.2% by mass, and is also preferably not more than 3.0% by mass, more preferably not more than 2.0% by mass and even more preferably not more than 1.0% by mass, from the viewpoint of suppressing increase in viscosity of the water-based ink and improving continuous ejection properties of the water-based ink as well as from the viewpoint of obtaining good printed materials that are free of occurrence of color migration or deformation of the printing medium.

(Content of Water)

The content of water in the water-based ink is preferably not less than 35% by mass, more preferably not less than 40% by mass and even more preferably not less than 45% by mass, and is also preferably not more than 75% by mass, more preferably not more than 70% by mass and even more preferably not more than 65% by mass, from the viewpoint of improving continuous ejection properties and storage stability of the water-based ink as well as from the viewpoint of obtaining good printed materials that are free of occurrence of color migration or deformation of the printing medium.

(Other Components)

The water-based ink used in the present invention may also contain, in addition to the aforementioned components, various ordinary additives such as a humectant, a wetting agent, a penetrant, a defoaming agent, an antiseptic agent, a mildew-proof agent and a rust preventive.

(Properties of Water-Based Ink)

In the case where the water-based ink is in the form of a black ink or a chromatic ink, the average particle size of the particles contained in the water-based ink is preferably not less than 40 nm, more preferably not less than 60 nm and even more preferably not less than 80 nm, and is also preferably not more than 250 nm, more preferably not more than 220 nm, even more preferably not more than 200 nm and further even more preferably not more than 180 nm, from the viewpoint of improving storage stability and ejection properties of the water-based ink.

In the case where the water-based ink is in the form of a white ink, the average particle size of the particles contained in the white water-based ink is preferably not less than 100 nm, more preferably not less than 150 nm and even more preferably not less than 200 nm, and is also preferably not more than 400 nm, more preferably not more than 350 nm, even more preferably not more than 300 nm and further even more preferably not more than 280 nm, from the viewpoint of covering the image 1 printed by a black ink and/or a chromatic ink with the white ink.

From the viewpoint of improving ejection durability of the water-based ink, the static surface tension of the water-based ink as measured at 20° C. is preferably not less than 22 mN/m, more preferably not less than 24 mN/m and even more preferably not less than 25 mN/m, and is also preferably not more than 45 mN/m, more preferably not more than 40 mN/m and even more preferably not more than 35 mN/m.

The viscosity of the water-based ink as measured at 32° C. is preferably not less than 2.0 mPa·s, more preferably not less than 3.0 mPa·s and even more preferably not less than 4.0 mPa·s, and is also preferably not more than 12 mPa·s, more preferably not more than 9.0 mPa·s and even more preferably not more than 7.0 mPa·s, from the viewpoint of improving continuous ejection properties of the water-based ink.

The pH value of the water-based ink is preferably not less than 7.0, more preferably not less than 8.0, even more preferably not less than 8.5 and further even more preferably not less than 8.7 from the viewpoint of improving storage stability and continuous ejection properties of the water-based ink as well as from the viewpoint of obtaining good printed materials that are free of occurrence of color migration or deformation of the printing medium, and is also preferably not more than 11.0 and more preferably not more than 10.0 from the viewpoint of improving resistance of members to the water-based ink and suppressing skin irritation.

Meanwhile, the average particle size, static surface tension, viscosity and pH value of the water-based ink may be measured by the methods described in Examples below.

<Ink-Jet Printing Method>

The ink-jet printing method of the present invention includes the step of ejecting a water-based ink onto a printing medium using a printing apparatus to print characters or images on the printing medium, said printing apparatus including an ink-jet printing head that ejects the water-based ink onto the printing medium that is transported in a feeding direction thereof upon printing; and an drying mechanism that is disposed on a downstream side in a feeding direction of the printing medium, in which the printing medium is in the form of a transparent resin printing medium, and the water-based ink includes a white ink, and in which the drying mechanism blows a superheated steam against at least one of a front surface and a rear surface of the printing medium.

(Transparent Resin Printing Medium)

The transparent resin printing medium used in the present invention may be in the form of either a sheet of paper or a rolled paper. However, from the viewpoint of enhancing productivity of printed materials, among them, preferred is a rolled printing medium.

As the transparent resin printing medium, there may be mentioned a transparent synthetic resin film. Examples of the transparent synthetic resin film as the transparent resin printing medium include a polyester film, a polyvinyl chloride film, a polypropylene film, a polyethylene film, a nylon film, etc. These films may be in the form of any of a biaxially stretched film, a monoaxially stretched film and a non-stretched film. Among these films, preferred are a polyester film and a stretched polypropylene film, and more preferred are a polyester film such as a polyethylene terephthalate film subjected to a surface treatment such as a corona discharge treatment, and a biaxially stretched polypropylene film.

The thickness of the transparent resin printing medium is not particularly limited, and the transparent resin printing medium may be in the form of a thin film having a thickness of less than 1 μm. However, the thickness of the transparent resin printing medium is preferably not less than 1 μm, more preferably not less than 20 µm, even more preferably not less than 30 µm and further even more preferably not less than 35 µm, and is also preferably not more than 100 µm, more preferably not more than 80 µm and even more preferably not more than 75 µm, from the viewpoint of suppressing deformation of the printing medium as well as from the viewpoint of improving availability of the printing medium.

Examples of commercially available products of the transparent synthetic resin film include "LUMIRROR T60" (polyethylene terephthalate) available from Toray Industries, Inc., "TAIKO FE2001" (corona-treated polyethylene terephthalate) available from Futamura Chemical Co, Ltd., "PVC80B P" (polyvinyl chloride) available from Lintec Corporation, "KINATH KEE 70CA" (polyethylene) available from Lintec Corporation, "YUPO SG90 PAT1" (polypropylene) available from Lintec Corporation and "BONYL RX" (nylon) available from Kohjin Film & Chemicals Co., Ltd., etc.

[Ink-Jet Printing Head]

The ink-jet printing apparatus used in the present invention preferably includes a plurality of ink-jet printing heads that are capable of ejecting a plurality of water-based inks.

As the ink-jet printing heads, there may be used any types of printing heads including a serial-type printing head and a line-type printing head, but the line-type printing head is preferably used in the present invention. The line-type printing head is a printing head of an elongated shape having a length near a width of the printing medium. In the ink-jet printing apparatus using the line-type printing head, while keeping the printing head in a stationery state and moving the printing medium along a transporting direction thereof, droplets of the ink are ejected from openings of nozzles of the printing head in association with the movement of the printing medium, whereby it is possible to allow the ink droplets to adhere onto the printing medium to print characters or images, etc., thereon.

The ink droplets are preferably ejected by a piezoelectric method. In the piezoelectric method, the ink droplets are ejected from a number of nozzles communicated with respective pressure chambers by vibrating a wall surface of the respective pressure chambers by means of a piezoelectric element. Meanwhile, in the present invention, there may also be used a thermal method for ejecting the ink droplets.

The voltage applied to the printing head is preferably not less than 5 V, more preferably not less than 10 V and even more preferably not less than 15 V, and is also preferably not more than 40 V, more preferably not more than 35 V and even more preferably not more than 30 V, from the viewpoint of conducting the high-speed printing with a high efficiency, etc.

The drive frequency of the printing head is preferably not less than 2 kHz, more preferably not less than 5 kHz and even more preferably not less than 8 kHz, and is also preferably not more than 80 kHz, more preferably not more than 70 kHz and even more preferably not more than 60 kHz, from the viewpoint of conducting the high-speed printing with a high efficiency, etc.

[Printing Method]

The amount of the ink droplets ejected is preferably not less than 0.5 pL, more preferably not less than 1.0 pL, even more preferably not less than 1.5 pL and further even more preferably not less than 1.8 pL, and is also preferably not more than 20 pL, more preferably not more than 15 pL and even more preferably not more than 13 pL, as calculated per one ink droplet ejected, from the viewpoint of maintaining accuracy of impact positions of the ink droplets and improving quality of printed characters or images.

The printing head resolution is preferably not less than 400 dpi (dot/inch), more preferably not less than 500 dpi and even more preferably not less than 550 dpi.

From the viewpoint of reducing viscosity of the water-based ink and improving continuous ejection properties of the water-based ink, the inside temperature of the printing head, preferably a line-type printing head, upon the printing, is preferably controlled to not lower than 20° C., more preferably not lower than 25° C. and even more preferably not lower than 30° C., and is also preferably controlled to not higher than 45° C., more preferably not higher than 40° C. and even more preferably not higher than 38° C.

The temperature of the surface of the printing medium opposed to an ink-ejection region of the printing head, preferably the line-type printing head, is preferably controlled to not lower than 35° C., more preferably not lower than 40° C. and even more preferably not lower than 45° C., and is also preferably controlled to not higher than 75° C., more preferably not higher than 65° C., even more preferably not higher than 60° C. and further even more preferably not higher than 55° C.

The transportation speed of the printing medium is preferably not less than 10 m/min, more preferably not less than 20 m/min and even more preferably not less than 30 m/min from the viewpoint of enhancing productivity of printed materials. The transportation speed of the printing medium means a velocity of movement of the printing medium in the direction along which the printing medium is transported upon the printing.

[Water-Based Ink]

The water-based ink used in the present invention contains a white ink, and is preferably constituted of a plurality of water-based inks further containing a black ink and/or a chromatic ink in addition to the white ink.

The temperature of the surface of the printing medium onto which the water-based ink such as the white ink is ejected is preferably not lower than 35° C., more preferably not lower than 40° C. and even more preferably not lower than 45° C., and is also preferably not higher than 75° C., more preferably not higher than 70° C. and even more preferably not higher than 60° C.

The amount of the water-based ink deposited on the printing medium is preferably not less than 0.1 g/m$^2$, and is also preferably not more than 25 g/m$^2$ and more preferably not more than 20 g/m$^2$, in terms of a solid content thereof, from the viewpoint of improving image quality of the resulting printed materials and increasing the printing speed.

[Fusing/Curing Means]

The ink-jet printing apparatus of the present invention may also include fusing/curing means for the following purpose. That is, after ejecting the water-based ink, i.e., the black ink and/or the chromatic ink, onto the printing medium to print characters or images thereon, the black ink and/or the chromatic ink thus ejected are fused/cured on the printing medium so as to prevent droplets of the respective inks from suffering from intercolor bleeding therebetween even when the inks are successively ejected from the next printing head.

The term "fusing" as used herein means a concept including both penetration of the inks impacted onto the printing medium into fibers of paper thereof and drying of the inks from the surface of the printing medium, and also indicates such a condition that the ink impacted on the surface of the printing medium is no longer present in the form of droplets thereon. In addition, the term "curing" as used herein means such a condition that the ink droplets impacted onto the printing medium are solidified so that the ink is fixed onto the surface of the printing medium.

Examples of the fusing/curing means include an apparatus capable of applying a thermal energy to the inks on the printing medium, such as a heater, a hot-air fan, etc.

Meanwhile, the white ink may be subsequently ejected onto the image 1 formed by at least one ink selected from the group consisting of the black ink and the chromatic ink to cover and hide the image 1 with the white ink, so that the image 1 may be printed with a background formed by the white ink.

[Drying Mechanism]

In the present invention, a drying mechanism may also be disposed on a downstream side in the feeding direction of the printing medium to dry the printing medium. In the drying mechanism, a superheated steam that is heated to a temperature of not lower than 100° C. and not higher than 180° C. is blown against at least one of a printing surface and an opposite surface of the printing medium to thereby dry the printing medium.

As the drying mechanism, there is preferably used the below-mentioned superheated steam injection apparatus.

(Superheated Steam)

The superheated steam (SHS) used in the method of the present invention means a steam that is heated to an elevated temperature higher than a dew point thereof under a given pressure. The aforementioned pressure is preferably not less than 0.01 MPa and more preferably not less than 0.09 MPa, and is also preferably not more than 1 MPa and more preferably not more than 0.2 MPa. The pressure is preferably substantially atmospheric pressure because under such a pressure, it is not necessarily required to use a pressure reaction apparatus in the method. The "substantially" used herein means that although the pressure is not positively increased or reduced from atmospheric pressure, slightly increased pressure or slightly reduced pressure relative to atmospheric pressure which will be caused owing to operation of the apparatus can be permitted.

As an embodiment of the superheated steam, there may be mentioned a normal pressure superheated steam that is heated to a temperature higher than 100° C. under atmospheric pressure (0.1 MPa). The normal pressure superheated steam is preferably used because it is not necessary to use a facility for increasing or reducing the pressure upon production thereof, and therefore the superheated steam can be produced at low cost.

The superheated steam can be obtained, for example, by applying a three-phase current voltage to a flow path-forming member through which saturated steam is flowed to directly heat the steam by energization thereof, or by subjecting the flow path-forming member to induction heating to isobarically heat the steam, etc.

The difference between a dew point of the steam and an actual temperature of the steam under the given pressure is referred to as a degree of superheating. The degree of superheating of the superheated steam that is brought into contact with the printing medium in the present invention is preferably not less than 10 K, more preferably not less than 30 K and even more preferably not less than 50 K from the viewpoint of efficiently drying the printing medium, and is also preferably not more than 200 K, more preferably not more than 150 K and even more preferably not more than 100 K from the viewpoint of improving cost efficiency and facilitating control of the degree of superheating.

The temperature of the superheated steam that is brought into contact with the printing medium is preferably higher than 100° C., more preferably not lower than 110° C. and even more preferably not lower than 120° C. from the viewpoint of efficiently drying the printing medium, and is also preferably not higher than 180° C., more preferably not higher than 170° C., even more preferably not higher than 160° C., further even more preferably not higher than 155° C., still further even more preferably not higher than 150° C. and still further even more preferably not higher than 148° C. from the viewpoint of suppressing deformation of the resulting printed materials and saving energy consumed for production thereof.

In addition, the temperature of the surface of the printing medium when bringing the printing medium into contact with the superheated steam is preferably not lower than 35° C., more preferably not lower than 40° C. and even more preferably not lower than 45° C., and is also preferably not higher than 75° C., more preferably not higher than 70° C. and even more preferably not higher than 60° C.

The amount of the superheated steam injected to the printing medium is preferably not less than 1 kg/h, more preferably not less than 2 kg/h, even more preferably not less than 4 kg/h, further even more preferably not less than 8 kg/h, still further even more preferably not less than 12 kg/h and still further even more preferably not less than 16 kg/h, and is also preferably not more than 50 kg/h, more preferably not more than 45 kg/h, even more preferably not more than 40 kg/h, further even more preferably not more than 35 kg/h, still further even more preferably not more than 30 kg/h and still further even more preferably not more than 25 kg/h, from the viewpoint of efficiently drying the printing medium while suppressing deformation of the resulting printed materials.

The injection time of the superheated steam as measured under such a condition that the amount of the superheated steam injected falls in the aforementioned range is preferably not less than 0.2 second, more preferably not less than 0.5 second, even more preferably not less than 0.8 second, further even more preferably not less than 1.0 second and still further even more preferably not less than 1.2 seconds from the viewpoint of efficiently drying the printing medium, and is also preferably not more than 10 seconds, more preferably not more than 8 seconds, even more preferably not more than 6 seconds and further even more preferably not more than 4 seconds from the viewpoint of enhancing productivity of the printed materials.

Examples of commercially available products of the superheated steam injection apparatus include an induction superheater "UPSS-W20" available from TOKUDEN Co., Ltd., etc.

<Ink-Jet Printing Apparatus>

Figure 1:
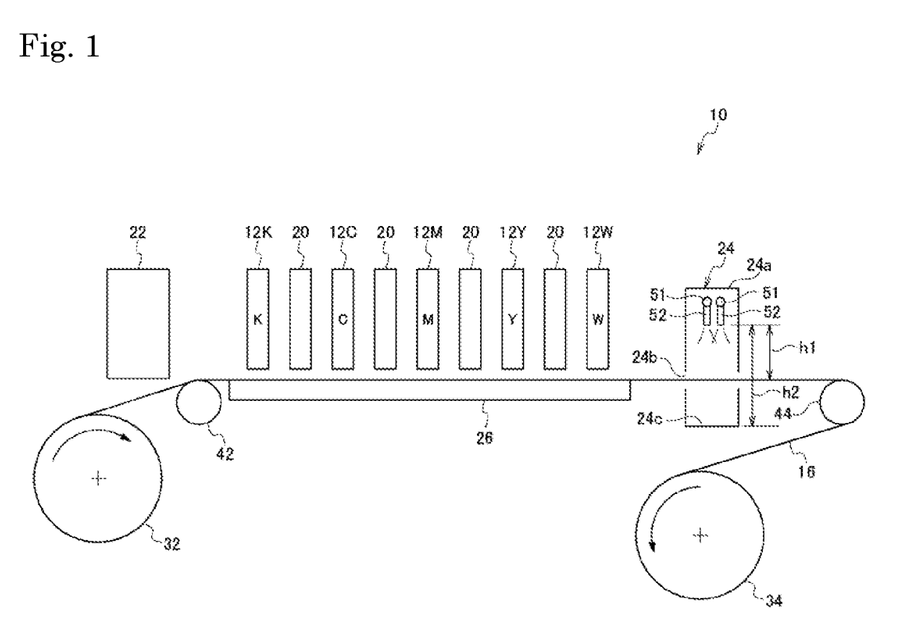
FIG. 1 is a schematic structural view showing an embodiment of an ink-jet printing apparatus used in the present invention.
Figure 2:
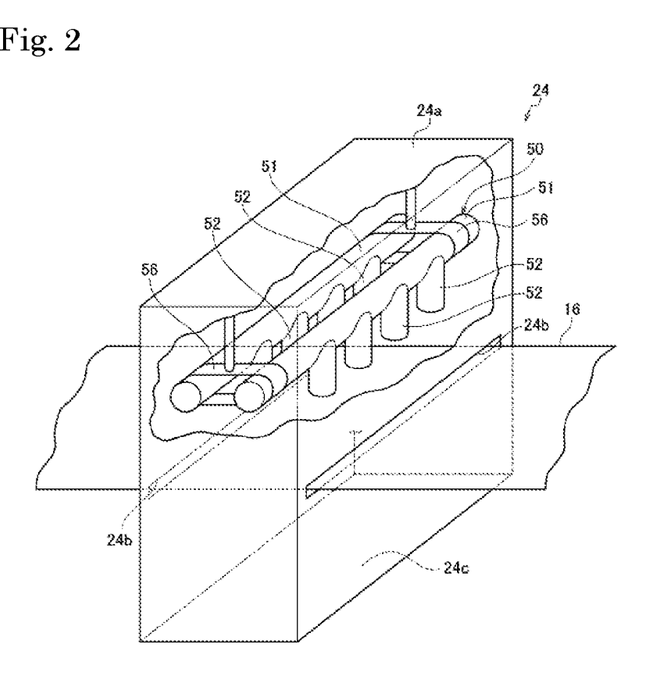
FIG. 2 is an explanatory view showing an embodiment of a superheated steam injection apparatus used in the present invention.

Next, the ink-jet printing apparatus suitably used in the ink-jet printing method of the present invention is explained by referring to FIGS. 1 and 2.

FIG. 1 is a schematic structural view showing an embodiment of an ink-jet printing apparatus used in the present invention. In FIG. 1, there is shown an ink-jet printing apparatus 10 which is an apparatus for printing characters or images on a transparent resin printing medium 16 using a water-based ink that is constituted of a black ink (K), a cyan ink (C), a magenta ink (M), a yellow ink (Y) and a white ink (W).

The ink-jet printing apparatus 10 includes a plurality of printing heads 12K, 12C, 12M, 12Y and 12W, a preheater section 22, a plurality of fusing/curing means 20, an under heater section 26 and a drying mechanism 24 constructed of a superheated steam injection apparatus.

The printing medium 16 is formed of a rolled transparent synthetic resin film, and wound around a take-up core 32 from on one end side thereof. The printing medium 16 wound off from the take-up core 32 is transported via the preheater section 22, a turning roller 42, the printing heads 12K, 12C, 12M, 12Y and 12W, the fusing/curing means 20, the under heater section 26 and a turning roller 44, and then wound around a take-up core 34.

The preheater section 22 is in the form of a heater for preliminarily heating the printing medium 16. Examples of the heater constituting the preheater section 22 include a surface heater and a hot air heater.

The printing heads 12K, 12C, 12M and 12Y are operated for ejecting predetermined amounts of the black ink (K), the cyan ink (C), the magenta ink (M) and the yellow ink (Y), respectively, onto a printing surface of the printing medium 16 to thereby print an image 1 thereon. The printing heads are each preferably in the form of a line-type printing head in which a plurality of printing nozzles are arranged in line. The color inks are ejected from the respective printing heads while transporting the printing medium 16, so that the colored image 1 can be formed on the printing medium 16. Meanwhile, in FIG. 1, there is illustrated the ink-jet printing apparatus in which the black ink and the three chromatic inks including the cyan ink (C), the magenta ink (M) and the yellow ink (Y) are used. However, five or more color inks may also be used in the ink-jet printing apparatus.

The fusing/curing means 20 are respectively disposed between adjacent two of the printing heads 12K, 12C, 12M, 12Y and 12W to fuse and cure the black ink (K), the cyan ink (C), the magenta ink (M) and the yellow ink (Y), respectively, which have been ejected onto the printing surface of the printing medium 16. Examples of the fusing/curing means 20 include an apparatus capable of applying a thermal energy to the inks on the printing medium, such as a heater, a hot-air fan, etc.

The under heater section 26 serves as a heating device for heating the printing medium 16 from a rear surface side of the printing medium 16. The under heater section 26 may be, for example, constructed of a heater of a hot water type or a heater of a thermoelectric type having a stainless steel or ceramic plate.

The drying mechanism 24 is disposed on a downstream side of the printing head 12W such that the surface of the white image obtained in the step 2 is heated and dried to rapidly fuse and cure the white ink (W). The drying mechanism 24 blows a superheated steam against at least one of a printing surface and an opposite surface of the printing medium 16.

FIG. 2 is an explanatory view showing an embodiment of the superheated steam injection apparatus as the drying mechanism 24.

As shown in FIG. 2, the superheated steam injection apparatus 24 includes a container 24a and a superheated steam injector 50 disposed inside of the container 24a. As shown in FIGS. 1 and 2, the container 24a has slits 24b through which the printing medium 16 is allowed to pass.

The superheated steam injector 50 includes a flow path-forming member 51 formed of a conductive material within which a flow path is formed, one or more injection nozzles 52 connected to the flow path-forming member 51, a heating mechanism (not shown) for heating the flow path-forming member 51 by energization thereof to heat a steam (saturated steam) flowing through the flow path and thereby produce the superheated steam, and support members 56 for securing the flow path-forming member 51 to the container 24a.

The flow path-forming member 51 is constructed of, for example, a stainless steel conduit. In addition, the injection nozzles 52 each have an opening opposite to at least one of a printing surface and an opposite surface of the printing medium 16.

The heating mechanism may be a mechanism for applying a three-phase current voltage from a three-phase current power source to the flow path-forming member 51 for direct energization thereof to heat the flow path-forming member 51 by Joule heat generated owing to an internal resistance of the flow path-forming member 51 whereby the steam flowing through the flow path-forming member 51 can be heated, or may be a mechanism for subjecting the flow path-forming member 51 to induction heating. The thus constructed superheated steam injector 50 serves for directly blowing the superheated steam to at least one of a printing surface and an opposite surface of the printing medium 16.

The respective injection nozzles 52 are disposed such that a tip end thereof is spaced at a distance h1 apart from the surface of the printing medium 16 passing through an inside of the container 24a, and also spaced at a distance h2 apart from a bottom 24c of the container 24a. The distance h1 is preferably not less than 10 mm, more preferably not less than 30 mm and even more preferably not less than 50 mm, and is also preferably not more than 300 mm, more preferably not more than 200 mm and even more preferably not more than 150 mm, from the viewpoint of efficiently drying the printing medium while suppressing deformation of the resulting printed materials. The distance h2 is preferably not less than 100 mm, more preferably not less than 150 mm and even more preferably not less than 300 mm, and is also preferably not more than 1000 mm, more preferably not more than 800 mm and even more preferably not more than 600 mm, from the same viewpoint as described above.

The superheated steam injector 50 operates for blowing the superheated steam heated to a temperature of not lower than 100° C. and not higher than 180° C. to the printing medium 16.

The arrangement of a plurality of injection nozzles 52 is not particularly limited. For example, the injection nozzles may be disposed in 2 to 6 rows relative to 1 to 3 printing lines. In FIG. 2, the injection nozzles are disposed in 2 printing lines×4 rows.

The distance between the adjacent two injection nozzles 52 disposed along one printing line is preferably not less than 30 mm, more preferably not less than 50 mm and even more preferably not less than 80 mm, and is also preferably not more than 300 mm, more preferably not more than 200 mm and even more preferably not more than 150 mm.

In addition, by suitably combining injection regions of the plurality of injection nozzles 52 with each other (for example, by overlapping the injection regions of the adjacent injection nozzles with each other), it is possible to uniformly blow the superheated steam over the printing medium 16 and thereby uniformly heat and dry the printing medium 16.

EXAMPLES

In the following Production Examples, Examples and Comparative Examples, the "part(s)" and "%" indicate "part(s) by mass" and "% by mass", respectively, unless otherwise specified.

(1) Measurement of Weight-Average Molecular Weight of Polymer

The weight-average molecular weight of the polymer was measured by gel permeation chromatography [GPC apparatus: "HLC-8120GPC" available from Tosoh Corporation; columns: "TSK-GEL, α-M"×2 available from Tosoh Corporation; flow rate: 1 mL/min)] using a solution prepared by dissolving phosphoric acid and lithium bromide in N,N-dimethyl formamide such that the concentrations of phosphoric acid and lithium bromide in the solution were 60 mmol/L and 50 mmol/L, respectively, as an eluent, and using a monodisperse polystyrene having a known molecular weight as a reference standard substance.

(2) Measurement of Average Particle Sizes of Pigment-Containing Polymer Particles and Fusing Aid Polymer Particles The particles were subjected to cumulant analysis using a laser particle analyzing system "ELS-8000" available from Otsuka Electrics Co., Ltd., to measure an average particle size thereof. The above measurement was conducted under the conditions including a temperature of 25° C., an angle between incident light and detector of 90° and a cumulative number of 100 times, and a refractive index of water (1.333) was input to the analyzing system as a refractive index of the dispersing medium. The measurement was also conducted by adjusting a concentration of the dispersion to be measured to $5 \times 10^{-3}$% by mass in terms of a solid content thereof.

(3) Measurement of Solid Content of Water Dispersion

Sodium sulfate dried to constant weight in a desiccator was weighed in an amount of 10.0 g and charged into a 30 mL polypropylene container (φ: 40 mm; height: 30 mm), and about 1.0 g of a sample to be measured was added to the container. The contents of the container were mixed with each other and then accurately weighed. The resulting mixture was maintained in the container at 105° C. for 2 hours to remove volatile components therefrom, and further allowed to stand in a desiccator for 15 minutes to measure a mass thereof. The mass of the sample after removing the volatile components therefrom was regarded as a mass of solids therein. The solid content of the sample was calculated by dividing the mass of the solids by the mass of the sample initially added.

(4) Measurement of Viscosity of Water-Based Ink

The viscosity of the water-based ink was measured at 32° C. using an E-type viscometer "TV-25" (equipped with a standard cone rotor (1°34'×R24); rotating speed: 50 rpm) available from Toki Sangyo Co., Ltd.

(5) Measurement of Static Surface Tension of Water-Based Ink

A platinum plate was dipped in 5 g of the water-based ink filled in a cylindrical polyethylene container (3.6 cm in diameter×1.2 cm in depth), and the static surface tension of the water-based ink was measured at 20° C. using a surface tension meter "CBVP-Z" (tradename) available from Kyowa Interface Science Co., Ltd.

(6) Measurement of pH of Water-Based Ink

The pH value of the water-based ink was measured at 25° C. using a bench-top pH meter "F-71" available from Horiba Ltd., equipped with a pH electrode "6337-10D" available from Horiba Ltd.

Production Example 1 (Synthesis of Pigment Dispersing Polymer)

Sixteen (16) parts of methacrylic acid available from Wako Pure Chemical Industries, Ltd., 44 parts of styrene available from Wako Pure Chemical Industries, Ltd., 30 parts of a styrene macromonomer "AS-6S" (number-average molecular weight: 6,000; solid content: 50%) available from Toagosei Co., Ltd., and 25 parts of methoxypolyethylene glycol methacrylate "BLEMMER PME-200" available from NOF Corporation were mixed with each other to prepare 115 parts of a monomer mixture solution.

Eighteen (18) parts of methyl ethyl ketone and 0.03 part of 2-mercaptoethanol as a chain transfer agent as well as 10% (11.5 parts) of the monomer mixture solution prepared above were charged into a reaction vessel and mixed with each other, and then an inside atmosphere of the reaction vessel was fully replaced with a nitrogen gas.

Separately, a mixed solution prepared by mixing remaining 90% (103.5 parts) of the monomer mixture solution, 0.27 part of the aforementioned chain transfer agent, 42 parts of methyl ethyl ketone and 3 parts of 2,2'-azobis(2,4-dimethylvaleronitrile) "V-65" as a polymerization initiator available from Wako Pure Chemical Industries, Ltd., was charged into a dropping funnel. In a nitrogen atmosphere, the mixed solution in the reaction vessel was heated to 75° C. while stirring, and then the mixed solution in the dropping funnel was added dropwise thereinto over 3 hours. After the elapse of 2 hours from completion of the dropwise addition while maintaining the resulting mixed solution at a temperature of 75° C., a solution prepared by dissolving 3 parts of the aforementioned polymerization initiator in 5 parts of methyl ethyl ketone was added to the mixed solution, and the resulting reaction solution was further aged at 75° C. for 2 hours and at 80° C. for 2 hours, followed by further adding 50 parts of methyl ethyl ketone thereto, thereby obtaining a solution of a pigment dispersing polymer (having a weight-average molecular weight of 50,000). The solid content of the thus obtained pigment dispersing polymer solution was 45% by mass.

Production Example 2 (Production of Water Dispersion of Black Pigment-Containing Polymer Particles)

Added into a solution prepared by dissolving 95.2 parts of the pigment dispersing polymer solution obtained in Production Example 1 in 53.9 parts of methyl ethyl ketone were 15.0 parts of a 5N sodium hydroxide aqueous solution and 0.5 part of a 25% ammonia aqueous solution both acting as a neutralizing agent as well as 341.3 parts of ion-exchanged water. Then, 100 parts of C.I. Pigment Black 7 (P.B. 7) as a carbon black pigment available from Cabot Japan K.K., was further added to the resulting mixture to prepare a pigment mixed solution. The degree of neutralization of the polymer in the thus prepared pigment mixed solution was 78.8 mol %. The pigment mixed solution was mixed at 20° C. for 1 hour using a disper blade operated at 7000 rpm. The resulting dispersion was dispersed under a pressure of 180 MPa using a Microfluidizer "High-Pressure Homogenizer M-140K" available from Microfluidics Corporation by passing the dispersion through the device 15 times.

The thus obtained dispersion of the black pigment-containing polymer particles was held at 60° C. under reduced pressure to remove methyl ethyl ketone therefrom, followed by further removing a part of water therefrom. The resulting dispersion was subjected to centrifugal separation, and a liquid layer portion separated therefrom was filtered through a filter "Minisart Syringe Filter" (pore diameter: 5 μm; material: cellulose acetate) available from Sartorius Inc., to remove coarse particles therefrom, thereby obtaining a water dispersion of the black pigment-containing polymer particles. The solid content of the thus obtained water dispersion was 25% by mass.

Then, 0.45 part of an epoxy crosslinking agent "DENACOL EX 321L" (tradename; trimethylolpropane polyglycidyl ether; epoxy equivalent: 130) available from Nagase ChemteX Corporation and 15.23 parts of ion-exchanged water were added to 100 parts of the resulting water dispersion of the black pigment-containing polymer particles, and the resulting mixture was subjected to heat treatment at 70° C. for 3 hours while stirring. After cooling the mixture to room temperature, a liquid layer portion separated therefrom was filtered through a filter "Minisart Syringe Filter" (pore diameter: 5 µm; material: cellulose acetate) available from Sartorius Inc., to remove coarse particles therefrom, thereby obtaining a water dispersion of the black pigment-containing polymer particles (solid content: 22% by mass). The average particle size of the black pigment-containing polymer particles in the resulting water dispersion was 100 nm. The results are shown in Table 1.

Production Example 3 (Production of Water Dispersion of White Pigment-Containing Polymer Particles)

A 5 L plastic container was charged with 2500 g of a polyacrylic acid dispersant "ARON AC-10SL" (solid content: 40%) available from Toagosei Co., Ltd., and 3.57 g of ion-exchanged water, and then while cooling the thus filled container in an ice bath and stirring the resulting solution therein at 100 rpm, 1666.43 g of a 5N sodium hydroxide aqueous solution was slowly added thereto to neutralize the polymer. The aqueous solution obtained by the neutralization was mixed with ion-exchanged water to adjust a solid content of the solution to 20%, thereby obtaining a neutralized aqueous solution of the polyacrylic acid dispersant.

Then, a 2 L plastic container was charged with 30.0 g of the thus obtained neutralized aqueous solution of the polyacrylic acid dispersant, 300 g of C.I. Pigment White 6 (P.W. 6; titanium oxide "CR80") available from ISHIHARA SANGYO KAISHA, LTD., and 306 g of water. Then, 1000 g of zirconia beads were added to the container, and the contents of the container were dispersed for 8 hours using a bench top-type pot mill pedestal available from AS ONE Corporation. Thereafter, the resulting dispersion was filtered through a metal mesh to remove the zirconia beads from the resulting dispersion, and then ion-exchanged water was added to the dispersion to adjust a solid content thereof to a desired value, thereby obtaining a water dispersion of white pigment-containing polymer particles (solid content: 30% by mass). The average particle size of the white pigment in the resulting water dispersion was 270 nm. The results are shown in Table 1.

TABLE 1

| Water Dispersion of Pigment-Containing Polymer Particles | | | | Production Example 2 | Production Example 3 |
|---|---|---|---|---|---|
| Water dispersion | Kind of pigment | | | Black P.B. 7 | White P.W. 6 |
| | Solid content (%) | | | 22.00 | 30.00 |
| | Ratio of pigment introduced (%) | | | 68.76 | 98.00 |
| Composition (part(s) by mass) | Pigment (A) | | | 15.13 | 29.40 |
| | Pigment dispersing polymer (B-1) | Polymer obtained in Production Example 1 | | 6.48 | — |
| | | "ARON AC-10SL" | | — | 0.60 |

TABLE 1-continued

| Water Dispersion of Pigment-Containing Polymer Particles | | Production Example 2 | Production Example 3 |
|---|---|---|---|
| | "DENACOL EX 321L" | 0.39 | — |
| | Ion-exchanged water | 78.00 | 70.00 |
| | Total | 100.00 | 100.00 |
| Properties | Viscosity (mPa · s) | 4.2 | 3.1 |
| | pH | 9.9 | 7.1 |
| | Average particle size (nm) | 100 | 270 |

Production Example 4 (Production of Water Dispersion of Fusing Aid Polymer Particles)

A 1000 mL separable flask was charged with 145 parts of methyl methacrylate available from Wako Pure Chemical Industries, Ltd., 50 parts of 2-ethylhexyl acrylate available from Wako Pure Chemical Industries, Ltd., 5 parts of methacrylic acid available from Wako Pure Chemical Industries, Ltd., 18.5 parts of "LATEMUL E118B" (emulsifier; active ingredient content: 26%) available from Kao Corporation, 96 parts of ion-exchanged water and potassium persulfate available from Wako Pure Chemical Industries, Ltd., and the content of the flask were stirred using an agitation blade (300 rpm), thereby obtaining a monomer emulsion.

A reaction vessel was charged with 4.6 parts of "LATEMUL E118B", 186 parts of ion-exchanged water and 0.08 part of potassium persulfate, and an inside atmosphere of the reaction vessel was fully replaced with a nitrogen gas. In a nitrogen atmosphere, the contents of the reaction vessel were heated to 80° C. while stirring with an agitation blade (200 rpm), and then the aforementioned monomer emulsion was charged into a dropping funnel and added dropwise into the reaction vessel over 3 hours to allow the monomer emulsion to react with the contents of the reaction vessel. The concentration of the fusing aid polymer particles as solid components in the resulting water dispersion of the fusing aid polymer particles was 41.6% by weight, and the average particle size of the fusing aid polymer particles was 100 nm.

Production Example 5 (Production of Black Ink)

A mixed solution was prepared by mixing 508.9 g of the water dispersion of the black pigment-containing polymer particles (solid content: 22.0% by mass) obtained in Production Example 2, 48.3 g of the water dispersion of the fusing aid polymer particles (solid content: 41.6% by weight) produced in Production Example 4, 44.0 g of diethylene glycol monoisobutyl ether (b.p. 230° C.), 286.0 g of propylene glycol (b.p. 188° C.), 5.5 g of a silicone-based surfactant "KF-6011" (polyether-modified silicone; HLB: 14.5) available from Shin-Etsu Chemical Industry Co., Ltd., and 207.3 g of ion-exchanged water with each other. The resulting mixed solution was filtered through a filter "Minisart Syringe Filter" (pore diameter: 5.0 µm; material: cellulose acetate) available from Sartorius Inc., thereby obtaining a black water-based ink. Various properties of the resulting black water-based ink are shown in Table 2.

Production Example 6 (Production of White Ink)

A mixed solution was prepared by mixing 374.2 g of the water dispersion of the white pigment-containing polymer particles (solid content: 30.0% by mass) obtained in Production Example 3, 132.3 g of the water dispersion of the fusing aid polymer particles (solid content: 41.6% by weight) produced in Production Example 4, 44.0 g of diethylene glycol monoisobutyl ether (b.p. 230° C.), 286.0 g of propylene glycol (b.p. 188° C.), 5.5 g of a silicone-based surfactant "KF-6011" (polyether-modified silicone) available from Shin-Etsu Chemical Industry Co., Ltd., and 235.3 g of ion-exchanged water with each other. The resulting mixed solution was filtered through a filter "Minisart Syringe Filter" (pore diameter: 5.0 µm; material: cellulose acetate) available from Sartorius Inc., thereby obtaining a white water-based ink. Various properties of the resulting white water-based ink are shown in Table 2.

TABLE 2

Water-Based Ink

| | | | Water-Based Inks | |
|---|---|---|---|---|
| | | | Production Example 5 | Production Example 6 |
| | Kind of ink | | Black | White |
| Ink composition | Black pigment-containing water dispersion | part(s) by mass | 508.9 | — |
| | White pigment-containing water dispersion | part(s) by mass | — | 374.2 |
| | Water dispersion of fusing aid polymer particles | part(s) by mass | 48.3 | 132.3 |
| | Propylene glycol (C) | part(s) by mass | 286.0 | 286.0 |
| | Diethylene glycol monoisobutyl ether (C) | part(s) by mass | 44.0 | 44.0 |
| | Silicone-based surfactant (D) | part(s) by mass | 5.5 | 5.5 |
| | 1N NaOH aqueous solution | part(s) by mass | — | 22.8 |
| | Ion-exchanged water | part(s) by mass | 207.3 | 235.3 |
| | Content of pigment (A) | % | 7.0 | 10.0 |
| | Content of polymer (B) | % | 5.0 | 5.2 |
| | Content of high-boiling organic solvent (C) | % | 30.0 | 30.0 |
| Properties | Average particle size | nm | 101.0 | 265.0 |
| | Viscosity at 32° C. | mPa·s | 5.5 | 5.7 |
| | Static surface tension | mN/m | 28.7 | 27.5 |
| | pH | | — | 9.2 |
| | | | | 8.8 |

Example 1

Using the respective water-based inks, characters or images were printed onto a corona discharge-treated PET "TAIKO Polyethylene Terephthalate Film FE2001" having a thickness of 25 µm available from Futamura Chemical Co, Ltd., by the following ink-jet printing method to thereby obtain a printed material.

(Ink-Jet Printing Method)

Under the environmental conditions of a temperature of 25±1° C. and a relative humidity of 30±5%, the water-based inks were loaded into a print evaluation apparatus available from Trytech Co., Ltd., equipped with line-type ink-jet printing heads "KJ4B-HD06MHG-STDV" (piezoelectric type) available from Kyocera Corporation. At this time, the line-type printing head loaded with the black ink and the line-type printing head loaded with the white ink were disposed such that they were spaced at a distance of 55 cm apart from each other in the print evaluation apparatus.

An A4-size film heater available from Kawai Corporation was fixedly mounted to a transportation table for transporting the corona discharge-treated PET as the printing medium so as to heat and dry the surface of the printing medium immediately after being printed.

The operating conditions of the print evaluation apparatus were set to a head applied voltage of 26 V, a drive frequency of 20 kHz, an ejected ink droplet amount of 5 pL, a head temperature of 32° C., a head resolution of 600 dpi, a number of ink shots for flashing before being ejected of 200 shots and a negative pressure of −4.0 kPa, and the printing medium was fixed on the film heater (at which the temperature of the surface of the printing medium was 50° C.) such that the longitudinal direction of the printing medium was aligned with a transporting direction thereof.

Then, a printing command was transmitted to the print evaluation apparatus, and the printing medium was transported at a transportation speed of 50 m/min to print a 100% Duty solid image of the black ink having a size of 5 cm×5 cm and a 100% Duty solid image of the white ink having a size of 5 cm×5 cm on the printing medium so as not to overlap these solid images on each other, thereby obtaining a printed material.

The resulting printed material was allowed to pass through the superheated steam injection apparatus shown in FIG. 2 (using an induction superheater "UPSS-W20" available from TOKUDEN Co., Ltd.) to inject a superheated steam at 140° C. to the printing material for 2.0 seconds from its printing surface side under the condition that the amount of the superheated steam injected (i.e., the amount of the superheated steam generated) was 20 kg/h, for drying the printed material, thereby obtaining a final printed material.

The occurrence of color migration and deformation of the resulting final printed material were evaluated according the following evaluation ratings. The results are shown in Table 3.

(Evaluation of Occurrence of Color Migration on Printed Material)

A: No color migration occurred when rubbing the surface of the resulting printed material with fingers.

B: Slight color migration occurred when rubbing the surface of the resulting printed material with fingers, but there were present no significant problems even when used in practical applications.

C: Much color migration occurred when rubbing the surface of the resulting printed material with fingers, and the printed material got wet on its surface and therefore suffered from problems when used in practical applications.

(Evaluation of Deformation of Printed Material)

A: No deformation such as distortion of the resulting printed material was recognized when visually observed.

B: Slight deformation such as distortion of the resulting printed material was recognized when visually observed, but there were present no significant problems even when used in practical applications.

C: Large deformation such as distortion of the resulting printed material was recognized when visually observed, and there were present significant problems when used in practical applications.

Examples 2 to 4 and Comparative Examples 1 and 2

The same procedure as in Example 1 was repeated except that the injection conditions of the superheated steam were changed as shown in Table 3. Furthermore, in Comparative Example 1, no superheated steam injection apparatus was used. The results are shown in Table 3.

TABLE 3

| | | Examples | | | | | | | | Comparative Examples | | | |
| --- | --- | --- | --- | --- | --- | --- | --- | --- | --- | --- | --- | --- | --- |
| | | 1 | | 2 | | 3 | | 4 | | 1 | | 2 | |
| Kind of water-based ink | | Black | White | Black | White | Black | White | Black | White | Black | White | Black | White |
| Content of high-boiling organic solvent (C) in water-based ink | % | 30.0 | 30.0 | 30.0 | 30.0 | 30.0 | 30.0 | 30.0 | 30.0 | 30.0 | 30.0 | 30.0 | 30.0 |
| Temperature of surface of printed material upon printing | °C. | 50 | 50 | 50 | 50 | 50 | 50 | 50 | 50 | 50 | 50 | 50 | 50 |
| Injection conditions of super-heated steam | Temperature | °C. | 140 | 140 | 140 | 140 | 140 | 140 | 155 | 155 | — | — | 200 | 200 |
| | Amount of steam injected | kg/h | 20 | 20 | 20 | 20 | 5 | 5 | 5 | 5 | — | — | 20 | 20 |
| | Surface to be injected | — | 1* | 1* | 2* | 2* | 1* | 1* | 1* | 1* | — | — | 1* | 1* |
| | Injection time | sec | 2.0 | 2.0 | 2.0 | 2.0 | 2.0 | 2.0 | 2.0 | 2.0 | — | — | 2.0 | 2.0 |
| Evaluation of printed material | Color migration | — | A | A | A | A | A | A | A | A | C | C | A | A |
| | Deformation of printed material | — | A | A | A | A | A | A | B | B | A | A | C | C |

Note
1*: Printing surface of printing medium
2*: Opposite surface of printing medium

Comparative Example 3

The same procedure as in Example 1 was repeated except that the superheated steam injection apparatus was replaced with a short-wave infrared heater "ZKC4800/600G" available from Heraeus K.K., and the drying procedure was conducted by irradiating short-wave infrared rays at an energy density of 100 kw/m² for 2.0 seconds using the short-wave infrared heater, thereby obtaining a printed material.

Then, as a result of evaluating the thus obtained printed material with respect to occurrence of color migration and deformation of the printed material by the same method as in Example 1, it was confirmed that the occurrence of color migration and deformation of the printed material in the case of using the white ink both were rated as Rank A, whereas the occurrence of color migration in the case of using the black ink was rated as Rank A, but the deformation of the printed material in the case of using the black ink was rated as Rank C. Thus, in the case of using the black ink, the printed material obtained using the short-wave infrared heater suffered from large deformation, and therefore had problems when used in practical applications.

From Table 3 and the results of Comparative Example 3, it was confirmed that the printing methods used in Examples 1 to 4 in which the superheated steam heated to a temperature of not lower than 100° C. and not higher than 180° C. was blown against the printing medium printed were free of occurrence of color migration and deformation of the printed material even when printed using the water-based ink containing the white ink, as compared to the printing methods used in Comparative Examples 1 to 3.

INDUSTRIAL APPLICABILITY

According to the ink-jet printing method of the present invention, it is possible to obtain good printed materials that are free of occurrence of color migration and deformation of a printing medium even when printed on a transparent resin printing medium using a water-based ink containing a white ink and a black or chromatic ink.

REFERENCE SIGNS LIST

10: Ink-jet printing apparatus
12K, 12C, 12M, 12Y, 12W: Printing heads
16: Printing medium
20: Fusing/curing means
22: Preheater section
26: Under heater section
32, 34: Take-up cores
24: Drying mechanism, superheated steam injection apparatus
24a: Container
24b: Slits through which printing medium 16 is passed
50: Superheated steam injector
51: Flow path-forming member
52: Injection nozzles

The invention claimed is:

1. An ink-jet printing method comprising the step of ejecting a water-based ink onto a printing medium using a printing apparatus to print characters or images on the printing medium, said printing apparatus comprising an ink-jet printing head that ejects the water-based ink onto the printing medium that is transported in a feeding direction thereof; and a drying mechanism that is disposed on a downstream side in a feeding direction of the printing medium,
    in which the printing medium is in the form of a transparent resin printing medium, and a temperature of a surface of the printing medium upon printing is in the range 35° C. through 75° C., and
    the water-based ink comprises a white ink, and a black or chromatic ink, and
    in which a superheated steam injection nozzle is disposed such that a tip end thereof is spaced at a distance 10 mm through 300 mm apart from the surface of the printing medium, and the drying mechanism blows a superheated steam that is heated to a temperature of not lower than 100° C. and not higher than 148° C. against at least one of a printing surface and an opposite surface of the printing medium.

2. The ink-jet printing method according to claim 1, wherein a content of an organic solvent having a boiling point of not lower than 90° C. and lower than 250° C. in the black or chromatic water-based ink is not less than 15% by mass and not more than 35% by mass.

3. The ink-jet printing method according to claim 1, wherein the printing medium is a polyester film that is subjected to corona discharge treatment, or a stretched polypropylene film.

4. The ink-jet printing method according to claim 1, wherein a thickness of the printing medium is not less than 1 μm and not more than 100 μm.

5. The ink-jet printing method according to claim 1, wherein a temperature of the ink-jet printing head is not lower than 20° C. and not higher than 45° C.

6. The ink-jet printing method according to claim 1, wherein an amount of droplets of the water-based ink ejected is not more than 20 pL.

7. The ink-jet printing method according to claim 1, wherein a printing speed in terms of a transportation speed of the printing medium is not less than 20 m/min.

* * * * *